United States Patent [19]

Williams, Jr.

[11] 3,882,360

[45] May 6, 1975

[54] CROSSTALK SUPPRESSOR FOR MAGNETIC DEFLECTION YOKES

[75] Inventor: Errol Ray Williams, Jr., Round Rock, Tex.

[73] Assignee: International Business Machines Corporation, Armonk, N.Y.

[22] Filed: Sept. 7, 1973

[21] Appl. No.: 395,332

[52] U.S. Cl. .......... 315/395
[51] Int. Cl. .......... H01j 29/70
[58] Field of Search ...... 315/27 XY, 28, 29, 27 TD, 315/27 R, 24, 395

[56] References Cited

UNITED STATES PATENTS

| | | | |
|---|---|---|---|
| 2,678,413 | 5/1954 | Adler et al. | 315/27 XY |
| 3,546,630 | 12/1970 | Jordan | 315/29 |

*Primary Examiner*—Richard A. Farley
*Assistant Examiner*—J. M. Potenza
*Attorney, Agent, or Firm*—John L. Jackson

[57] ABSTRACT

Ringing in both the horizontal and vertical sections of a magnetic deflection yoke in a cathode ray tube system is eliminated by inserting a toroidal transformer in the low frequency axis deflection circuit. The flow of the common mode current is through one winding of the transformer, thence through the low frequency axis yoke winding and out of the transformer in the opposite direction through a second winding. The two windings through which the common mode current flows are balanced and series opposing and therefore no common mode signal is transferred to the third winding of the transformer. However, when an extraneous or unwanted signal is generated by the high frequency retrace signal through capacitance coupling between the horizontal and vertical windings, this unwanted signal is transferred from the two windings through which the common mode current flows to the third winding in the transformer. Thus, the two windings act as a primary to the third winding. Connected across the third winding is a variable resistor which can be adjusted to critically damp the ringing of the magnetic deflection circuits.

8 Claims, 5 Drawing Figures

CROSSTALK SUPPRESSOR FOR MAGNETIC DEFLECTION YOKES

BACKGROUND OF THE INVENTION

1. Field of the Invention

This invention relates to magnetic deflection circuits in general, and more particularly to a technique of preventing resonant ringing in both the horizontal and vertical windings.

2. Description of the Prior Art

In all prior art devices, where ringing has been considered to be a problem, the attempts to eliminate the ringing have been directed to only one axis or winding. It was not widely known that since the horizontal and vertical windings are wound over each other, that there is sufficient capactive coupling between the two, such that ringing occurs, not only in the horizontal circuitry, but in addition, occurs in the vertical deflection circuitry. Applicant did not realize that this was, in fact, the case until he actually measured currents through both of the windings.

U.S. Pat. No. 2,869,029 to L. Dietch teaches one technique of eliminating ringing. Dietch, however, is only concerned with the horizontal axis. Dietch adjusts an impedance in a tuning circuit to the ringing frequency of the horizontal winding in an attempt to eliminate the ringing in the horizontal winding. There is no discussion of the fact that there might in fact be ringing in the vertical axis due to the capacitive coupling between the two windings, and certainly no discussion as to any technique of preventing such ringing.

Another technique in the prior art to prevent ringing in the horizontal deflection circuitry is taught in U.S. Pat. No. 3,143,686 to Vonderschmitt, et al. Vonderschmitt teaches the alleviation of ringing by utilizing a smaller winding in the flyback transformer to increase the resonant frequency of the deflection circuit. Again, there is no addressing of or recognition of ringing in the vertical axis. Again, as above discussed, there is totally no concern by Vonderschmitt with the interaction between the vertical and horizontal windings.

Another approach to the elimination of ringing is taught in U.S. Pat. No. 2,964,674 to Murakami, et al. Murakami attacks the ringing problem, again, in only the horizontal deflection circuits and does not recognize the interaction between the horizontal and vertical windings. Murakami teaches a detailed mathematical analysis of the ringing problem and goes on to state that transient ringing can in fact be eliminated without the need of extra circuit components if the circuit parameters are properly selected to reduce the energy in the leakage circuits to zero at the end of the retrace cycle. In addition to not addressing the problem of interaction between the vertical and horizontal coils, Murakami teaches a technique which is quite impractical. That is, in the real world the controlling of the parameters of the circuit at television frequencies to prevent ringing as taught by Murakami would be practically impossible. However, in applicant's application wherein the sweep rates are approximately twice that which are taught by Murakami, the invention of Murakami could not be used.

SUMMARY OF THE INVENTION

Ringing in both the horizontal and vertical magnetic deflection yokes in a cathode ray tube system is eliminated by inserting a toroidal transformer in the low frequency deflection circuit. In applicant's configuration, unlike the usual case, the vertical circuit is the high frequency deflection circuit, and the horizontal circuit operates at a much lower frequency. The flow of the common mode current is through one winding of the transformer, thence through the horizontal winding and out of the transformer in the opposite direction through a second winding. The two windings through which the common mode current flows are balanced and series opposing and therefore no common mode signal is transferred to the third winding of the transformer. However, when an extraneous or unwanted signal is generated by the vertical retrace signal through capacitive coupling between the horizontal and vertical windings, this unwanted signal is transferred from the two windings through which the common mode current flows to the third winding in the transformer. Thus, the two windings act as a primary to the third winding. Connected across the third winding is a variable resistor which can be adjusted to critically damp the ringing of the magnetic deflection circuits.

DESCRIPTION OF THE PREFERRED EMBODIMENTS

Figure 1:
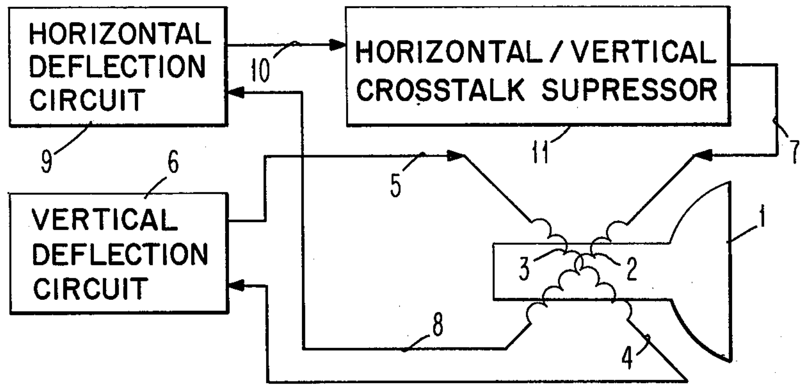
FIG. 1 is an overall block diagram showing the layout of the present invention as connected to a cathode ray tube.

For a more detailed description of the invention, refer first to FIG. 1. In FIG. 1 is shown a cathode ray tube 1 having horizontal windings 3 connected by means of lines 4 and 5 to vertical deflection circuit 6 and horizontal windings 2 connected along lines 7 to the output of a horizontal-vertical crosstalk suppressor circuit 11 and along line 8 to the horizontal deflection circuit 9. The horizontal deflection circuit 9 is also connected along line 10 to the horizontal-vertical crosstalk suppressor 11. All components in FIG. 1 are conventional with the exception of the horizontal-vertical crosstalk suppressor 11. This will hereinafter be described in detail. Finally, with respect to FIG. 1 while there is shown a CRT 1 having vertical and horizontal windings it will be appreciated by those skilled in the art that the cathode ray tube is merely exemplary of one type of device which can be driven by a magnetic deflection yoke. Other such devices are electron beam recorders, ink jet printers, electron microscopes, ocan converters, television cameras, etc. Obviously, applicants invention is applicable to any type of device having horizontal and vertical windings wherein crosstalk occurs between the windings which causes parasitic oscillations in the windings.

Figure 2:
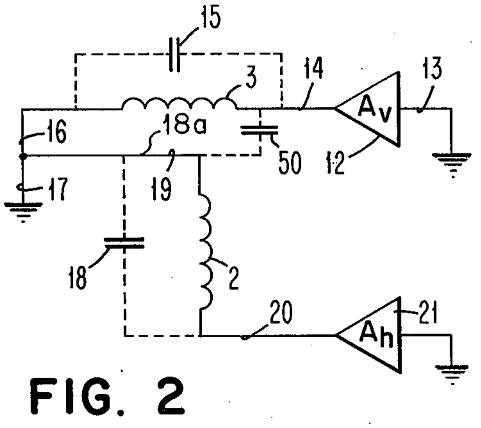
FIG. 2 is a schematic illustrating a typical horizontal and vertical drive circuit showing the distributed interwinding capacitances along with the capacitance which exists between the vertical and horizontal windings.
Figure 3:
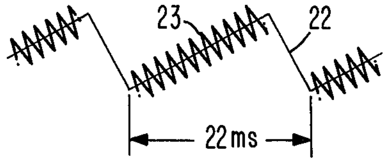
FIG. 3 illustrates the horizontal drive signal having superimposed thereon blips which are the result of the vertical drive signals being capacitively coupled to the horizontal winding.
Figure 4:
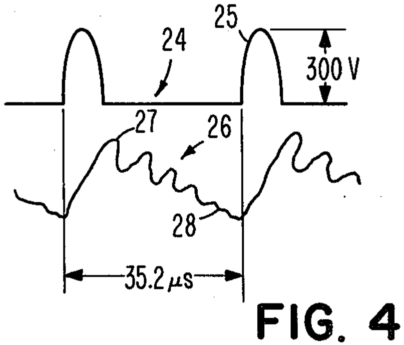
FIG. 4 illustrates the vertical pulses and resultant vertical sweep signals having superimposed thereon ringing occasioned by the cross-coupling of the horizontal and vertical windings.

For an analysis of the problem of ringing in both of the windings, refer next to FIG. 2. In FIG. 2 there is shown a vertical amplifier 12 which is of conventional form connected along line 13 to ground. The output of this vertical amplifier which is shown in FIG. 4, is approximately 300 volts during vertical retrace. The amplifier, as is conventional, is a low impedance, high voltage source. Its output is applied along line 14 through the vertical winding 3. Shown across the vertical winding 3 is the effective distributed interwinding capacitance 15. The winding 3 is connected along lines 16 and 17 to ground. Also shown in FIG. 3 is the horizontal amplifier, of conventional design, which is essentially a high impedance current source for the winding 2. The amplifier 21 is connected along line 20 to the horizontal winding 2. The horizontal winding 2 is connected along lines 19 and 17 to ground. Also shown in FIG. 2 is the interactive capacitance 50, which occurs between windings 2 and 3. Current flowing through this crosstalk capacitance causes ringing in both the vertical and horizontal axes. Ringing in both axes, as heretofore discussed, has not been generally recognized by those skilled in the art. The wave form 22 of FIG. 3 which is the horizontal sweep current wave form as illustrated, has superimposed on its blips 23. These blips are the result of the ringing of coil 2. This ringing phenomenon in a coil is well known. The blips 23 on the wave form 22 are caused by the transfer of current from the vertical amplifier 12 into the horizontal drive coil 2 through capacitance 50. These blips which number 630 per horizontal trace, occur each time the vertical amplifier 12 outputs the 300 volt signal to coil 3. Likewise, the vertical trace 26 has oscillations 27 occurring at the beginning of the wave form and as shown by 28 are normally dampened out before the end of the wave form. These parasitic oscillations 27 are again occasioned by the crosstalk between the horizontal winding 2 and the vertical winding 3. That is, each time coil 3 is excited (during vertical retrace), there is a transfer of energy over to horizontal winding 2 which causes ringing and a consequent transfer back through capacitance 50 of energy to vertical winding 3. Thus, as above discussed, there is crosstalk between the two coils, which affects not only the horizontal wave form, but in addition affects the vertical wave form.

Figure 5:
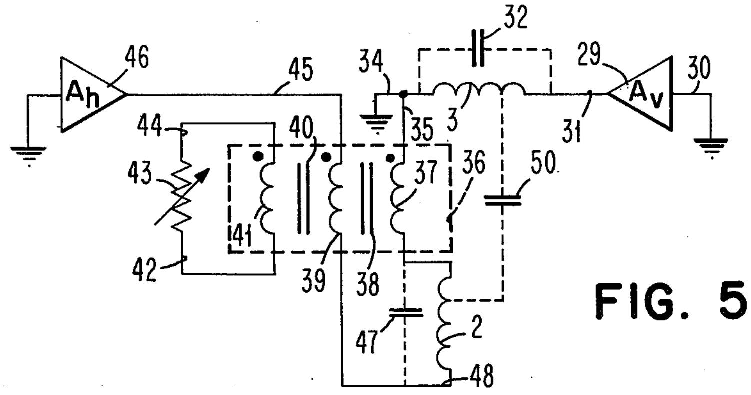
FIG. 5 is the circuit of FIG. 2 with a toroidal three winding transformer inserted in the horizontal deflection circuit having a winding which can be tuned to completely eliminate any ringing in both the vertical and horizontal windings.

Refer next to FIG. 5 wherein there is shown a circuit similar to that of FIG. 2, but which includes a toroidal transformer and an adjustable resistor which totally eliminates ringing in the windings. As shown in FIG. 5, there is a vertical amplifier 29 connected to ground having its output applied along line 31 to vertical deflection coil 3. Again, there is distributed interwinding capacitance 32 associated with coil 3. Coil 3 is also connected along line 34 to ground. Line 34 is also connected to line 35 which in turn is connected to a first winding 37 of transformer 36. The other side of winding 37 is connected to horizontal deflection coil 2. The other side of deflection coil 2 is connected along line 38 to a second winding 39 in transformer 36 and the other side of winding 39 is connected along line 45 to the horizontal amplifier 46. There is, as shown at 47, distributed interwinding capacitance associated with coil 2 as is usual. There is a third winding 41 in transformer 36 and one side of winding 41 is connected along line 42 to one side of a variable resistor 43 and the other side of the variable resistor 43 is connected along line 44 to the opposite end of winding 41.

As illustrated in FIG. 5, transformer 36 has, as is conventional, a core(s) 38 and 40 and the windings are common dotted. With this type of arrangement, the common mode current, which flows down line 35 through winding 37 through winding 2 and back up through winding 39 to ground through amplifier 46, is not affected since the windings 37 and 39 are balanced and series opposing. This prevents any common mode signal from being transferred to winding 41. However, since windings 37 and 39 are balanced and series opposing, any disturbance which is transferred through capacitance 50 to horizontal winding 2, which is not a result of the common mode current, will be transferred to winding 41. Resistor 43, which is a variable resistor, can then be adjusted to critically damp the yoke resonance to prevent ringing and thus, provide undistorted wave forms from both the horizontal and vertical deflection circuits. Thus, the elimination of parasitic oscillations or ringing in both the horizontal and vertical circuits can be accomplished without the utilization of resistive elements which would distort the common mode signal.

Placing the transformer in the low frequency circuit eliminates the requirement for high voltage insulation between transformer windings.

The transformer, itself, in a typical application has a core which is a high permability, paraline coated ferrite toroid. There are 13 trifilar turns of number 34 AWG polyurethane coated wire suitable for up to 105 degrees centigrade operation. The transformer is in an epoxy case filled with Emerson-Cummings No. 1467 epoxy resin. The value of the resistor 43 for this transformer is 1000 ohms where the common mode current is 40 ma peak during vertical retrace, the horizontal period is 22 msec; the horizontal amplitude is 1.4A peak-to-peak; the vertical wave form amplitude is 0.9A peak-to-peak; the vertical period is 35.2 msec. The yoke is a stator type with a vertical inductance of 1 mh and a horizontal inductance of 3 mh.

In summary, ringing in both the horizonal and vertical magnetic deflection yokes in a cathode ray tube system is eliminated by inserting a toroidal transformer in the horizontal deflection circuit. The flow of the common mode current is through one winding of the transformer, thence through the horizontal winding and out of the transformer in the opposite direction through a second winding. The two windings through which the common mode current flows are balanced and series opposing and therefore no common mode signal is transferred to the third winding of the transformer. However, when an extraneous or unwanted signal is generated by the vertical retrace signal through capacitive coupling between the horizontal and vertical windings, this unwanted signal is transferred from the two windings through which the common mode current flows to the third winding in the transformer. Thus, the two windings act as a primary to the third winding. Connected across the third winding is a variable resistor which can be adjusted to critically damp the ringing of the magnetic deflection circuits.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Means for preventing undesired ringing in both the horizontal and vertical sections of a magnetic deflection yoke comprising:

a fast retrace winding;

a high frequency voltage source connected to said fast retrace winding;

a low frequency trace winding capactively coupled to said fast retrace winding such that during retrace time a common mode current path is established which allows common mode current to flow through both of said windings such that said common mode current causes undesired ringing therein;

a low frequency current source providing current through said low frequency trace winding;

a transformer connected in said common mode current path having means associated therewith to damp said undesired ringing in both said trace and retrace windings.

2. The means for preventing undesired ringing of claim 1 wherein said transformer is operatively associated with said low frequency trace winding.

3. The means for preventing undesired ringing of claim 2 wherein said transformer includes first and second windings in said common mode path operatively connected to act as a primary to a third winding of said transformer, said third winding having means associated therewith for damping ringing in said trace and retrace windings.

4. The means for preventing undesired ringing of claim 3 wherein said first winding of said transformer is between said low frequency current source and said trace winding and said second winding is connected between said trace winding and ground.

5. The means for preventing undesired ringing of claim 4 wherein said first and second windings of said transformer are balanced and series opposed such that no common mode signal is transferred to said third winding.

6. The means for preventing undesired ringing of claim 5 wherein said means associated with said third winding for damping is an impedance connected across said third winding.

7. The apparatus of claim 6 wherein said impedance is a resistor.

8. The apparatus of claim 7 wherein said resistor is variable.

* * * * *